(12) United States Patent
Klann et al.

(10) Patent No.: US 7,465,924 B1
(45) Date of Patent: Dec. 16, 2008

(54) TRACKING OF MOVING RADIOACTIVE SOURCES

(75) Inventors: Raymond Klann, Bolingbrook, IL (US); Richard B. Vilim, Aurora, IL (US); Young Soo Park, Naperville, IL (US)

(73) Assignee: UChicago Argonne LLC, Chicago, IL (US)

( * ) Notice: Subject to any disclaimer, the term of this patent is extended or adjusted under 35 U.S.C. 154(b) by 44 days.

(21) Appl. No.: 11/413,698

(22) Filed: Apr. 28, 2006

(51) Int. Cl.
*G01J 5/00* (2006.01)
(52) U.S. Cl. .................................... 250/336.1; 250/395
(58) Field of Classification Search ................. 250/393, 250/336.1, 395
See application file for complete search history.

(56) References Cited

U.S. PATENT DOCUMENTS 5,324,948 A * 6/1994 Dudar et al. ................ 250/379
6,080,989 A * 6/2000 Royle et al. ................. 250/366

* cited by examiner

*Primary Examiner*—Constantine Hannaher
*Assistant Examiner*—Mark R Gaworecki
(74) *Attorney, Agent, or Firm*—Foley & Lardner LLP

(57) ABSTRACT

A system for detecting unsecured nuclear materials. Whereas current portal monitors rely in part on physical prominence to deter materials from entering the country, their application at intra-modal transport points may actually serve to divert the movement of nuclear materials rather than aid in interception. A flexible and low-profile system has been developed for unobtrusive detection and tracking of radioactive sources in transit suited for deployment at traffic choke points such as rest stops, toll collection plazas, truck stops, and bridges. The system includes gamma radiation detectors, networking for linking these detectors, signal processing algorithms, and a central processing and control unit.

20 Claims, 8 Drawing Sheets

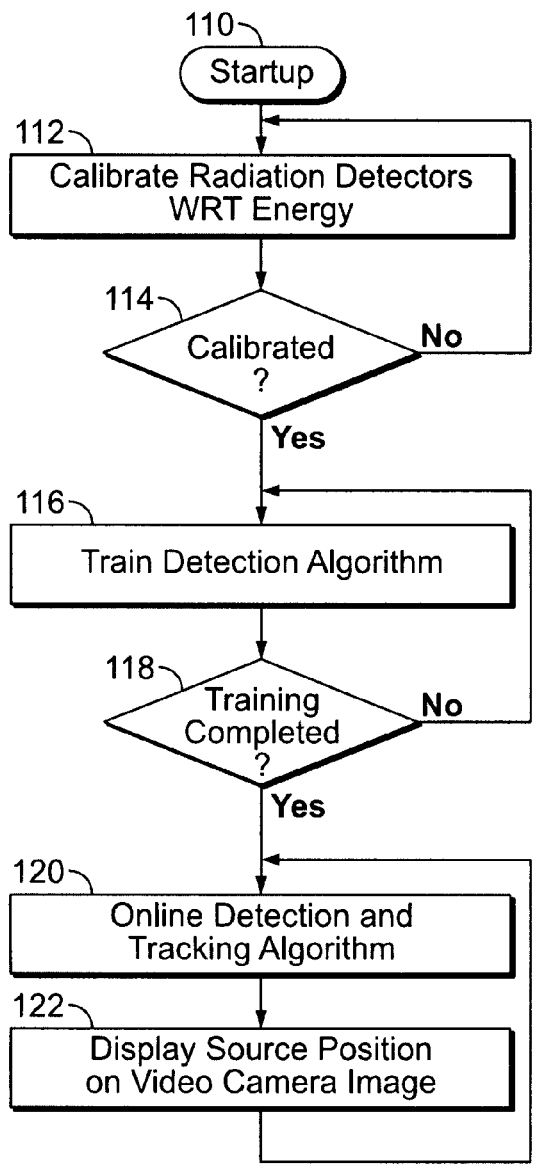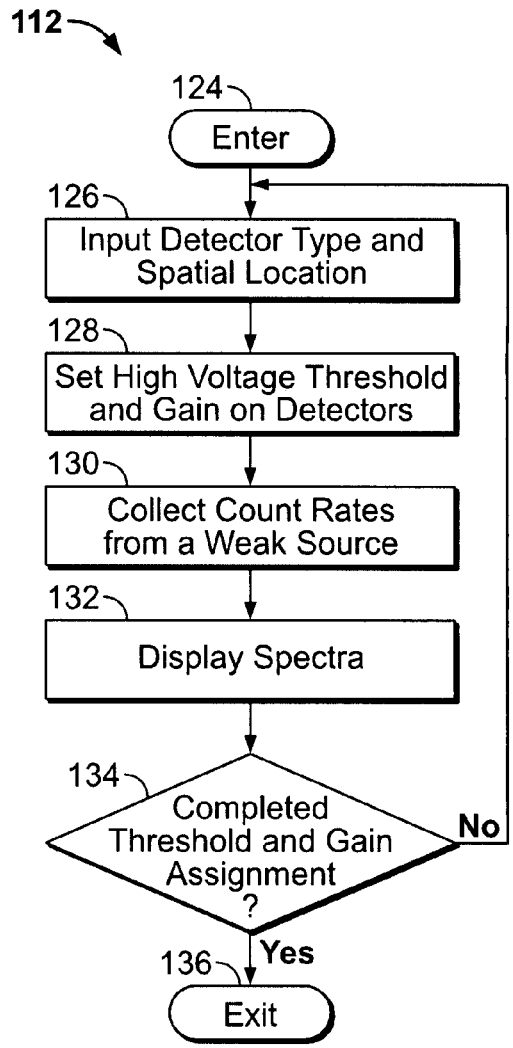
FIG. 1　　　　　FIG. 2

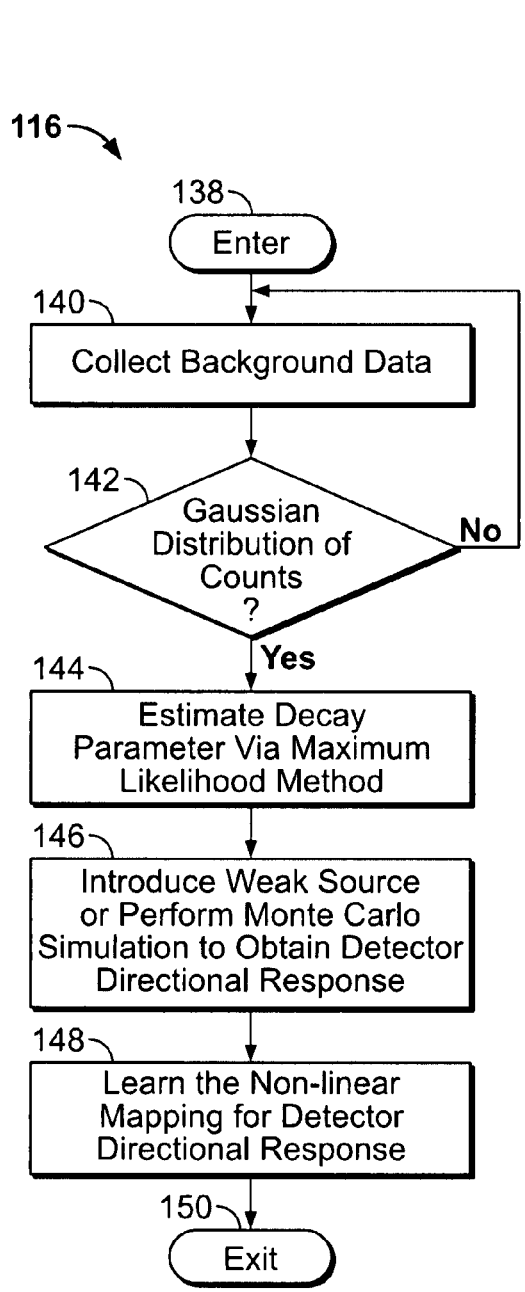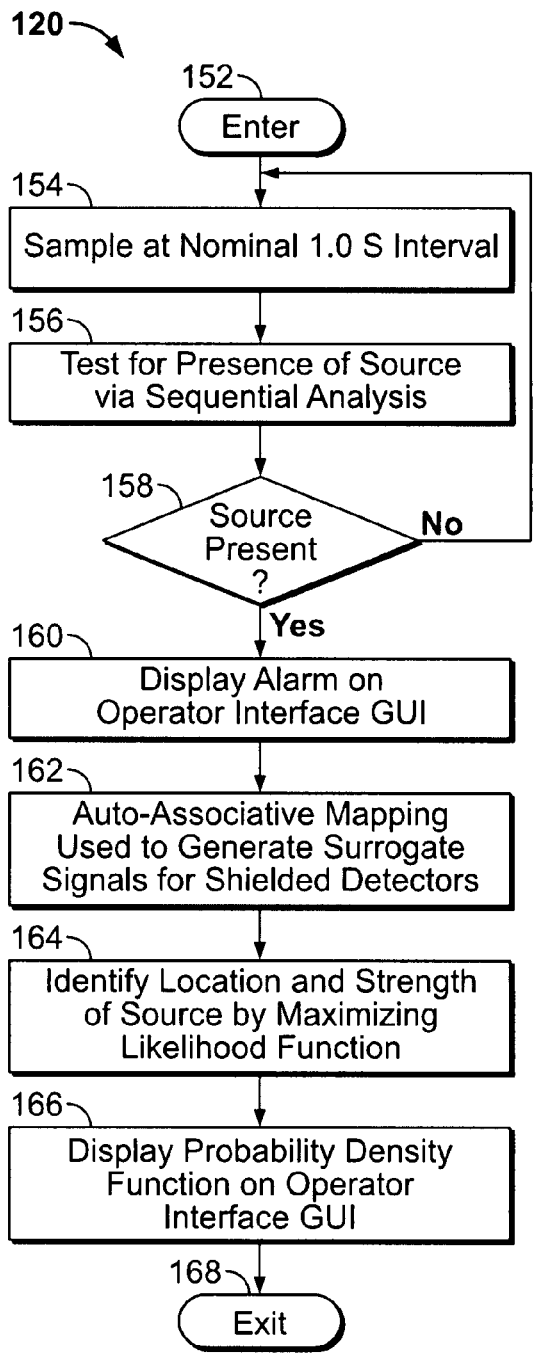
FIG. 3
FIG. 4

TRACKING OF MOVING RADIOACTIVE SOURCES

The United States Government has rights in this invention pursuant to Contract No. W-31-109-ENG-38 between the United States Government and Argonne National Laboratory.

BACKGROUND OF THE INVENTION

This invention relates to a portable monitor for tracking a source of radiation. More specifically this invention relates to a portable highly-sensitive radioactive source tracking system.

Current devices for radioactive source detection exist but their capabilities do not include a precise identification of the position of the source nor its movement. Data collection is independent, not correlated, and not stored. There are currently no systems which integrate signals from multiple sensors or which provide directional information or discrete source location information. In addition, prior systems allow a target to know that they are being tracked.

These prior art devices tend to be limited with respect to the range of geometrical configurations in which they can be deployed. Generally, they must be deployed in a single fixed geometrical arrangement of detectors and thus are limited to applications where the flow of traffic can be directed to meet the spatial requirements imposed by the detection device. This generally involves defining a surveillance pathway and having to alter the free flow of traffic so it is directed into the pathway. However, there is a need for a device capable of monitoring applications where the venue is defined by pre-existing boundaries such as walls or other barriers.

In particular, there are three deployment scenarios for which state-of-the-art methods are insufficient and can be significantly improved. The first scenario involves source interception along primary transportation corridors leading into major metropolitan centers. Choke points (such as rest stops, toll collection plazas, truck stops, weigh stations, and bridges) are logical hosting points where one could take advantage of existing infrastructure and visual clutter and where reduced traffic speed improves counting statistics. Since, presumably, these sites would not be among the intended site of ultimate dispersal and since the purveyor would be unaware that he has been detected, the element of surprise would exist. The second scenario involves source interception at border crossings and at maritime ports of entry in the plaza where traffic first congregates before being funneled into parallel lanes already equipped with deterrent-based portal monitors. An early-warning signal in advance of a signal from the existing system would provide increased response time. The third scenario involves personnel and small package monitoring i.e. mass transit stations, convention centers, stadiums, and airports. The tracking system could also be integrated with mobile systems with appropriate technology.

Thus, there is a need for a source tracking system which 1) detects the introduction of a source into the monitored area, 2) tracks its position in the monitored area, and 3) identifies the type of radioisotope and the source strength. These capabilities need to be provided in a way that minimizes the probability of false positives and the probability of a missed positive (false negative). In addition, for reasons related to equipment portability and cost, this must be achieved in environments where the signal-to-noise ratio may be lower than previously achievable.

SUMMARY OF THE INVENTION

The present invention relates to systems and methods for 1) detecting the introduction of a source into the monitored area, 2) tracking its position in the monitored area, and 3) identifying the type of radioisotope and the source strength. The present invention provides these capabilities while minimizing the probability of false positives and the probability of a missed positive (false negative) even in environments where the signal-to-noise ratio may be lower than previously achievable by prior systems.

In one embodiment, the present invention relates to a portable highly-sensitive radioactive source tracking system. In the scenario envisioned, the system can include one or more of gamma radiation detectors, networking, power, signal processing; algorithms, and central processing and control could be temporarily installed in an area to monitor for radioactive sources, to localize the source, and to track the movement of the source.

A solution to this problem must take account of a number of factors. The source may be shielded to reduce its dose rate for personnel protection or shielded in an attempt to hide its detection. With shielding materials present, the detectable gamma radiation will be distributed lower in energy due to Compton scattering. This results in a lower full energy photopeak and a larger continuum of lower energy photons. The likelihood of a signal of comparable intensity to background and overlapping in spectrum requires a sensitive test and one that incorporates the characteristics of the local background radiation environment. This suggests the use of statistical methods that take into account the variability of both the source and the background radiation fields and uncertainties in the electronic detection hardware. The need for timely near real-time predictions argue similarly. These uncertainties ultimately limit the precision with which the source location can be identified. The solution must also provide a measure of the uncertainty in the position of the source.

In one exemplary embodiment, the invention includes a portable, highly-sensitive radioactive source tracking system. In one embodiment, the system is intended for temporary installation to monitor an area for radioactive sources, to localize the source, and to track movement of the source. In another embodiment, the system of the present invention could also be used at fixed installations and in fixed configurations for the routine monitoring of source movements. The system exploits the mathematical relationships that exist among multiple detectors deployed in a known spatial configuration, the inherent sensitivity characteristics of the detectors, the properties of radioactive sources, and the correlation among signals from multiple detectors.

In one exemplary embodiment, the portable system of the present invention provides three distinct functions during monitoring: alarming when a source is detected by any single detector node, tracking of the location of the source in real-time, and collection of a gamma-ray energy spectrum for performing source identification.

The present invention allows for: 1) alarm on source presence (by detector), 2) source location, 3) source tracking, 4) source identification, 5) source strength determination. In one embodiment, the present invention offers the advantage of locating and tracking a source without having a person in close proximity to the source. In addition, the present invention is applicable to moving detectors when the detector and position data can be transmitted in near real-time.

These and other objects, advantages, and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1 is a flowchart overview of the one embodiment of the present invention;

FIG. 2 is a flow chart showing the steps in one embodiment for calibrating radiation detectors with respect to energy functions;

FIG. 3 is a flow chart depicting one embodiment of a train detection algorithm function;

FIG. 4 is a flow chart depicting one embodiment of an on-line detection and tracking algorithm function;

FIG. 8 is a screen shot of a high voltage input GUI for one embodiment of the present invention;

FIG. 9 is a screen shot of a detector calibration GUI for one embodiment of the present invention;

DETAILED DESCRIPTION OF THE PREFERRED EMBODIMENTS

Figure 5:
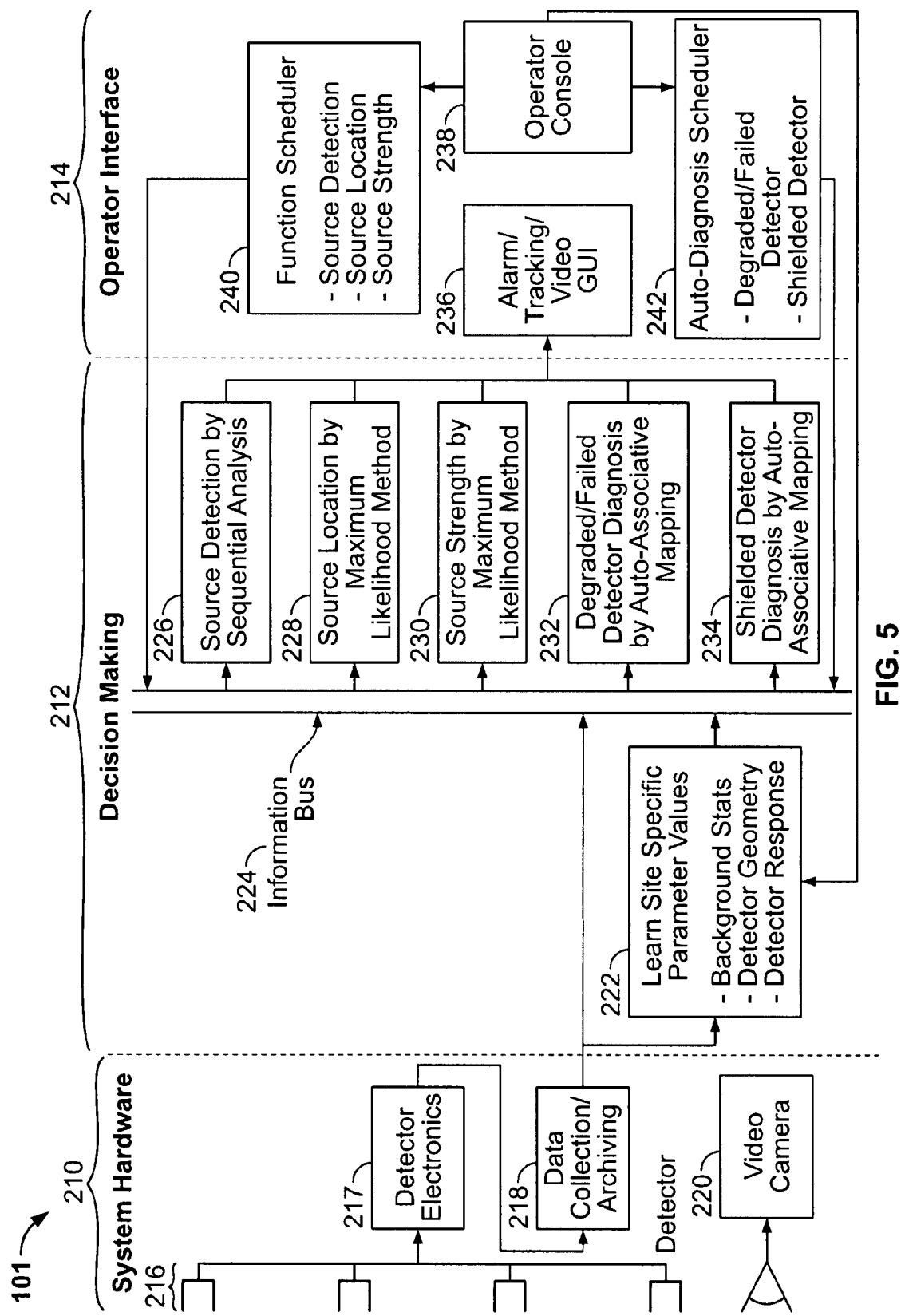
FIG. 5 is a source-tracking system architecture in accordance with the principles of the present invention.

The present invention relates to a portable system and methods for detection of radioactive sources and subsequent tracking. In general, the principal components of the present invention are detector electronics, data collection/archiving, operator console, functional capabilities, self diagnostics, supporting signal processing, detection, and backend electronics.

In one embodiment, the function capabilities of the present invention include detection of source, identification of source location, identification of source type, signal strength, and site-specific configuration and learning. In one embodiment, the self-diagnostics include a degraded detector diagnosis, a failed detector diagnosis, and a shielded detector diagnosis. In addition, in on embodiment, the supporting signal processing includes SAT, DDFM, and cluster analysis. One embodiment of the present invention utilizes NaI detectors with 14 pin connectors. One of ordinary skill in the art will appreciate that a variety of different sized detectors and different types could be used as known in the art.

FIG. 1 depicts a flow chart for one general method of operation for a device 101 (FIG. 5) of the present invention. The process begins with a startup step 110. The radiation detectors are calibrated in the calibration step 112. A check step 114 determines if the device is appropriately calibrated. If the device isn't calibrated properly, it re-enters step 112 for calibration again. If the device is calibrated properly, then it enters a training step 116. Following training 116, a training check 118 is performed to determine if training was accomplished. If not, then the training step 116 is repeated. However, if training was correct, then the device progresses to a online detection step 120. In one embodiment, the results of the online detection step 120 are shown in a display step 122. In an exemplary embodiment, the device alternates between detection 120 and display 122, in another exemplary embodiment the device performs real-time or near simultaneous detection 120 and display 122.

FIG. 2 illustrates one embodiment of a calibration step 112. The device 101 enters at entry step 124 and proceeds to an input step for selection of a detector type and spatial location. Next the voltage threshold and gain for the detectors is set at step 128. A calibration collection step 130 collects count rates from a weak radiation source. Next a display step 132, the spectra for the weak radiation counted in step 130 is displayed. A gain and threshold check step 134 is performed following collection 130. If the threshold and gain assignments were not completed or correct, the device 101 proceeds again through steps 126, 128, 130, and 132. If the assignments were completed, then the calibration step 112 is exited at step 136.

FIG. 3 illustrates one embodiment of a training step 116. The device 101 enters the training step 116 at an entry step 128. A background collection step is performed to collect data regarding background radiation. An analysis step 142 is performed to determine if the background data exhibits Gaussian distribution. If not, the background collection step 140 is performed again. If the background data does exhibit a Gaussian distribution, then an estimation step 144 is performed to estimate the decay parameter, in one embodiment using the maximum likelihood method. Next, a directional response step 146 is performed. In one embodiment, a weak radiation source is introduced to obtain the detector's directional response. In another embodiment, a Monte Carlo simulation is performed to obtain the directional response. Following acquisition of the directional response in step 146, the non-linear mapping is determined in a mapping step 148 for the direction response of step 146. Once the non-linear mapping is learned, the device 101 exits the training step 116 at step 150.

FIG. 4 illustrates one embodiment of a detection step 120. The device 101 enters the detection step at 152. A sampling step 154 takes a sample of the environment at a predetermined interval, in an exemplary embodiment a one second interval. Next the sample is tested at step 156 for the presence of a radiation source, in an exemplary embodiment the testing utilizes sequential analysis. A presence determination is made at step 158, if no radiation source is detected, then steps 154 and 156 are performed again, if a source is detected, then the device 101 proceeds to step 160 for alarm display on a GUI. In one embodiment, following alarm display 160, an autoassociative mapping step 162 is performed to generate surrogate signals for shield detectors. A location step 164 locates the source and determines its strength, in one embodiment the maximizing likelihood function is used to make this determination. Following the determination in the location step 164, a display step 166 provides a graphical display of the probability or density of the environment to indicate the radiation source to a user. The display step 120 is exited at step 168.

FIG. 5 depicts one embodiment of the present invention. The portable detection device 101 includes data collection 210, decision making 212, and user interface 214 subsystems.

The data collection subsystem 210 includes at least one radiation detector 216, in communication with a data archiving/collection device 218. In an exemplary embodiment, the data collection subsystem 210 further includes a video device 220. The decision making subsystem 212 includes an information bus 224 for transporting data from the data collection subsystem 212 to be processed. In one embodiment, the processing includes in an exemplary embodiment detection of a source 226, location of the source 228, strength of the source 230, failed or degraded detector diagnosis 232, shield detector diagnosis 234. In one exemplary embodiment, the data from the data collection subsystem 210 may be processed to account for site specific learning 222. The portable detection device 101 further includes an operator interface subsystem 214. The operator interface subsystem 214 provides a user with information regarding the outputs of the other subsystems 210, 212 and provides the user with the ability to control the device 101. An operator console 238 is provided as a means for input by a user for controlling the device 101. In one embodiment, an auto diagnosis scheduler 242 is provided which controls the degraded/failed detector diagnosis 232 and the shielded detector diagnosis 234 for determination of the status of the at least one detector 216. In addition, a function schedule 240 provides the corresponding controls for the detection of source 226, location of source 228, and strength of source 230 processing.

Event Processing

A model for the emission of gamma rays from a radioactive source in accordance with the practice of the present invention is based upon a few basic assumptions. One of these is that the probability of a single emission per unit time is $\lambda$. It has been shown previously that the number of gamma rays, n, emitted in the time interval $\Delta t$ by a source is a random variable with Poisson distribution $$p(\lambda \Delta t \mid n) = \frac{(\lambda \Delta t)^n}{n!} e^{-\lambda \Delta t} \tag{1}$$

In the present invention, $\lambda$ is treated as a free parameter whose value depends on the type of source and will be estimated from measurements.

Thus, the counts registered by a detector near the source are a subset of all the emissions. The detector has a view which is a fraction of the total solid angle surrounding the source and only a fraction of the gamma rays that enter the detector actually register as events. That is, the detector has efficiency less than unity. Thus, for a given detector in a given position relative to a source only a fraction $\eta$ of the total emissions from the source register as events in the detector. The probability of the detector registering an emission per unit time is then $\eta\lambda$. Then the probability of an observed count rate n is from Eq. (1)

$$p(\eta\lambda \Delta t \mid n) = \frac{(\eta\lambda \Delta t)^n}{n!} e^{-\eta\lambda \Delta t} \tag{2}$$

When the average number of counts, $\eta\lambda\Delta t$, is large the Poisson distribution is well approximated by the Gaussian distribution $$p(\eta\lambda \Delta t \mid n) = \frac{1}{(2\pi\eta\lambda \Delta t)^{1/2}} e^{-\frac{(n-\eta\lambda \Delta t)^2}{2\eta\lambda \Delta t}} \tag{3}$$

Figure 6:
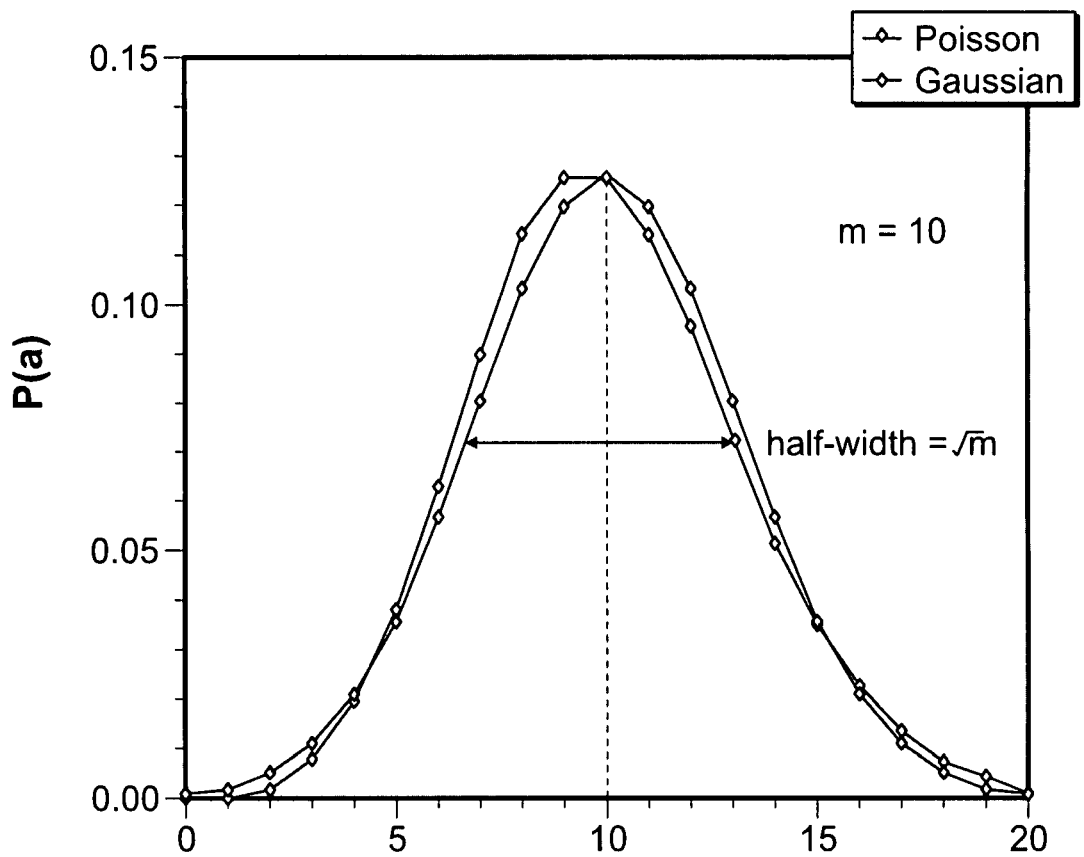
FIG. 6 is a comparison of Gaussian and Poisson distributions.

FIG. 6 compares Eqs. (2) and (3) for different values of the average number of counts. Essentially the figure shows that if the average is greater than 20, then Eq. (3) is a very good approximation to Eq. (1). Thus, the count window interval $\Delta t$ for the present invention is preferably large enough that on average at least 20 counts register. Similarly, as the count rate increases due to the introduction of a source, the window size of the present invention can be decreased and the Gaussian distribution still be preserved.

Signal Analysis

In one embodiment of the present invention, the introduction of a source can be detected by comparing the current count rate with the normal background count rate without a source present. A statistically significant deviation in total count rate from the historical norm for the background would suggest the presence of a new radiation source.

The Sequential Analysis Test (SAT) algorithm provides a highly sensitive test for detecting the presence of a source and for detecting when a detector is temporarily shielded or failing. It accomplishes this by forming the residual between an actual measurement and a value based on a probabilistic model of the process. Successive deviations in the residual from those implied by the model indicate that the model is no longer valid. That is, a source has entered the venue, a detector has become shielded, or a detector is failing.

The Data-Driven Functional Mapping ("DDFM") algorithm provides a capability to recall an association among signals that is implicit rather than explicit. That is, there is no requirement for declaration of independent variables as in the definition of a single valued function. This capability is used to create an auto-associative mapping that can be used to sense which out of a number of variables has deviated as a result of a new process unique to that variable that was not present at the time the mapping was learned. Important instances are a temporarily shielded or failing detector.

The Maximum Likelihood (ML) algorithm provides a capability to determine from sensor data values for unmeasured process model parameters such that resulting model is the one that most likely generated the data. This capability is used to determine the most likely position of a source given 1) detector readings and 2) a probabilistic model for the processes that give rise to detector counts from source emissions.

The State Estimation (SE) algorithm (with the Kalman Filter as a special case) provides a capability to predict the value of an unmeasured variable through a combination of measurements and a dynamic model for the process underlying the variable. The algorithm includes a representation for noise in the measurements and uncertainties in the model. The dynamic model provides the ability to include past measurements in addition to the current measurements (i.e., temporal data) to estimate a current value for the unmeasured variable. In our work, source position is an unmeasured variable. The dynamic model can be the equations of motion for the source or constraints on its spatially rate of change. Including past count data is a way to improve estimated source position over that obtained by only using the count from the current observation window.

The SAT is based on the likelihood ratio test of Wald, A. 1947. Sequential Analysis. John Wiley & Sons, New York, herein incorporated by reference. SAT supposes that a random process r uncorrelated in time is normally distributed with zero mean and depends on the parameter δ. The likelihood of observing $r_i$ given the parameter value $\delta_1$ is denoted $p(\delta|r_i)$. The task is to decide as each new observation becomes available what is the value of δ. If the choice is between two values, $\delta_1$ and $\delta_2$ then form the following test statistic:

$$S_m = \frac{p(\delta_1 \mid r_1)}{p(\delta_0 \mid r_1)} \frac{p(\delta_1 \mid r_2)}{p(\delta_0 \mid r_2)} \cdots \frac{p(\delta_1 \mid r_m)}{p(\delta_0 \mid r_m)} \qquad (4)$$

based on the sequence of observations $r_1, r_2, \ldots r_m$. One can form two hypotheses: $H_o$ that the parameter value is $\delta_1$, and $H_1$ that the parameter value is $\delta_2$. The decision process is If $S_m$#B terminate and accept $H_0$, else If $B<S_m<A$ continue sampling, else If $S_m \exists A$ terminate and accept $H_1$. (5)

with the probability that the wrong decision will be made given by $$B = \frac{\beta}{1-\alpha} \text{ and } A = \frac{1-\beta}{\alpha} \qquad (6)$$

where α is the probability that the test will result in the selection of $H_1$ when hypothesis 0 is correct and β is the probability that the test will result in the selection of $H_0$ when hypothesis 1 is correct.

In accordance with the principles of the present invention, this ratio test is used to decide with the arrival of each new measurement sample when the model is no longer a statistically valid representation of the background radiation. The present invention looks specifically for a drift in measurement count away from the model, characterizing the drift in terms of the parameter δ defined to be the difference between the mean of the model output and the measurement counts. Immediately following training and during subsequent normal operation its value will be zero. If, however, there is a change in the measurement counts, then δ will no longer be zero. To monitor its value, a residual vector is used:

$$r_i = y_{meas\,i} - y_i \qquad (7)$$

defined as the difference between the measurement counts $y_{meas\,i}$ and model output $y_i$ for input $u_i$. Both the model and measurement counts have the same variance $K_i$ and the mean value of the model output is μ and the mean value of the measurement counts is μ+δ. Then the likelihood function for the residual vector is defined by:

$$p(\delta \mid r_i) = \frac{1}{(2\pi)^{1/2} K_i^{1/2}} \exp\left(-\frac{1}{2K_i}(y_{measi} - \mu - \delta)^2\right) \qquad (8)$$

In one embodiment, failure is to be declared when the mean of the measurement counts has drifted away from the model by an amount $\delta = \delta_{bad}$. Thus, for two hypotheses: $H_0$, where δ=0; and $H_1$ where $\delta = \delta_{bad}$, the decision as to whether or not a failure has occurred is then given by Eq. (5) where the likelihood function is given by Eq. (5). The probability that a decision is incorrect is given by Eq. (6).

If the test for measurement count drift away from the model is to be symmetric, then a second test is needed for the case where $\delta = \delta_{bad}$. If the test is to be applied independently to each output and is to be symmetric, then a total of 2N tests is needed where N is the number of outputs. If $K_i$ is a constant, then it is more convenient to work with the natural logarithm of $S_m$ given by $$\ln S_m = \frac{1}{2} \sum_{i=1}^{m} (y_i - \mu - \delta_0)^2 K_i^{-1} - (y_i - \mu - \delta_1)^2 K_1^{-1}. \qquad (9)$$

The SAT algorithm is used to detect a change in detector counts from normal background thereby signaling the introduction of a source. An assumption is that Eq. (8) with δ=0 represents the probability distribution of background counts. The values of the two parameters, μ and K, which are specific to the site, are all that is needed to complete the description of background given by Eq. (8). In accordance with the principles of the present invention, these values can be estimated in one of two ways. In the maximum likelihood method, the values are those that maximize the probability that Eq. (8) generated an observed data set of background counts. Alternatively, if the number of these data is large, then the usual statistical estimators for mean and variance will yield good values in a computationally more straightforward manner than the maximum likelihood method.

Testing refers to the actual on-line real-time monitoring of total counts to detect statistically significant deviation of the count rate from normal background to estimate the position of the source. Normal background characteristics are established during training. There is a mathematical link as described above between the sensitivity of the test and the probability that a wrong, decision as to the presence of a source is made. In one embodiment, a user has control of the sensitivity through setting the values of the parameters A and B in Eq. (9), but as described above, the values then fix the probability of a wrong SAT decision. The maximum likelihood method is used. From previously estimated values of $\eta_0 \lambda_b \Delta t$, $\eta_i / \eta_0$, i=1, ..., N−1, and $\eta_0 \lambda_s \Delta t$, the most likely location of the source is located by maximizing with respect to location in two-dimensional space the likelihood Eq. (13) produced the detector data.

In accordance with the principles of the present invention, radioactive source that is concentrated at a point can be located in space through a combination of triangulation and the knowledge that the count rate falls off as one over the distance squared. However, since the count rate is a probability density function, the exact location will be subject to uncertainty. In the method of the present invention described below both the distance law and emission probability are used to derive the likelihood that the source is located at a particular position.

One embodiment of the present invention involves a Maximum Likelihood Algorithm. The probability distribution function of the counts that register at a detector is a function of the detection efficiency (intrinsic detector efficiency and solid angle) and the distance from the source. The source strength is a factor in the overall count rate but the probability density function is normalized per unit source emission. Let the subscript 0 designate a reference detector that is located a distance $r_0$ from a source with a total detection efficiency $\eta_0$. As before the probability of observing n counts while sampling for Δt is $$p(\eta_0 \lambda \Delta t \mid n) = \frac{1}{(2\pi \eta_0 \lambda \Delta t)^{1/2}} e^{-\frac{(n-\eta_0 \lambda \Delta t)^2}{2\eta_0 \lambda \Delta t}} \quad (10)$$

The parameter $\lambda$ is exclusive to the radioactive decay process and has no dependence on detector location or detection efficiency.

In the presence of background radiation the number of counts is the sum of the contribution from the source and from background. It is assumed the background can be characterized by a Gaussian distribution. The sum of the background counts and source counts, both normally distributed random variables, is a normal random variable with probability density function $$p(\eta_0 \lambda_s \Delta t, \eta_0 \lambda_b \Delta t \mid n) = \frac{1}{(2\pi(\eta_0 \lambda_s \Delta t + \eta_0 \lambda_b \Delta t))^{1/2}} e^{-\frac{(n-(\eta_0 \lambda_s \Delta t + \eta_0 \lambda_b \Delta t))^2}{2(\eta_0 \lambda_s \Delta t + \eta_0 \lambda_b \Delta t)}} \quad (11)$$

where subscripts s and b denote source and background, respectively.

Now consider a detector i with efficiency $\eta_i$ at a distance $r_i$ from the same source. The probability distribution function of the counts registered by the detector is $$p_i(\eta_0 \lambda_s \Delta t, \eta_0 \lambda_b \Delta t, r_0/r_i, \eta_i/\eta_0 \mid n) = \quad (12)$$

$$\frac{\exp\left(-\frac{\left(n - \left(\frac{\eta_i}{\eta_0}\right)\left(\left(\frac{r_0}{r_i}\right)^2 \eta_0 \lambda_s \Delta t + \eta_0 \lambda_b \Delta t\right)\right)^2}{2\left(\frac{\eta_i}{\eta_0}\right)\left(\left(\frac{r_0}{r_i}\right)^2 \eta_0 \lambda_s \Delta t + \eta_0 \lambda_b \Delta t\right)}\right)}{\left(2\pi \left(\frac{\eta_i}{\eta_0}\right)\left(\left(\frac{r_0}{r_i}\right)^2 \eta_0 \lambda_s \Delta t + \eta_0 \lambda_b \Delta t\right)\right)^{1/2}}$$

The above expression reflects the fact that the probability of a single count being observed in unit time is proportional to the detector efficiency and inversely proportional to the square of the distance to the source.

The probability that two detectors will see a particular set of counts can be derived from this. Let the subscripts i and j indicate the two detectors. Since a count seen at detector i is independent of a count at detector j (each count is the consequence of two separate disintegrations and the disintegrations are independent of each other) the joint probability is the product $p_i(\eta_0 \lambda \Delta t_s, \eta_0 \lambda \Delta t_b, r_0/r_i, \eta_i/\eta_0 \mid n_i) p_j(\eta_0 \lambda \Delta t_s, \eta_0 \lambda \Delta t_b, r_0/r_j, \eta_j/\eta_0)$. Thus, for N detectors, the probability density function for seeing counts $n_0, n_1, \ldots, n_{N-1}$ at detectors 0, 1, ..., N–1, respectively, is $$p(n_0, n_1, \ldots, n_{N-1}) = \prod_{i=0}^{N-1} p_i(\eta_0 \lambda_s \Delta t, \eta_0 \lambda_b \Delta t, r_0/r_k, \eta_i/\eta_0 \mid n_i) \quad (13)$$

where dropped from the left-hand side is the explicit reference to detector and source parameters. If the source is not in motion, then the above expression can be extended to take in multiple sample intervals.

The location of the source is taken to be the point where the likelihood of finding the source is greatest. This corresponds to the point where the joint probability density function given by Eq. (13) has its maximum value.

In one embodiment, a measure of the uncertainty in the estimate for the source location is provided by the behavior of the likelihood function in the region that surrounds the most likely location. Let $p(n_0, n_1, \ldots, n_{N-1}, r_0, r_1, \ldots, r_{N-1})$ denote the probability that the source is at $r_0, r_1, \ldots, r_{N-1}$ and let the point where p has maximum value, the most likely location of the source, be designated by $r_0', r_1', \ldots, r_{N-1}'$. Form the likelihood ratio $$\frac{p(n_0, n_1, \ldots, n_{N-1}, r_0, r_1, \ldots, r_{N-1})}{p(n_0, n_1, \ldots, n_{N-1}, r_0', r_1', \ldots, r_{N-1}')} \quad (14)$$

This function plotted as contours of constant value over two-dimensional space provides a graphical image of how well the source can be located in space. Closely spaced contour lies would indicate the likelihood that the source being at a particular point falls off rapidly as one moves away from the most likely point.

In the case where the likelihood function is to be maximized it is customary to operate on the negative of the natural logarithm. The resulting expression is simpler and the small numbers associated with a negative exponential are avoided. All the expressions for probability given above consist of products of the general form $$p(a(\gamma) \mid n) = \frac{1}{(2\pi a(\gamma))^{1/2}} e^{-\frac{1}{2}\left(\frac{n-a(\gamma)}{\sqrt{a(\gamma)}}\right)^2}, \mu = a(y) \text{ and } \sigma^2 = a(y) \quad (15)$$

where $\gamma$ is the parameter with over whose space the optimization is to be performed and $\mu$ the mean and $\sigma^2$ is the variance. The value of $\gamma$ at the maximum of a product of such terms is the same as the value at the minimum of the negative of the natural logarithm. That is $$\max_{\forall \gamma} \prod_i p(a_i(\gamma) \mid n) = \quad (16)$$

$$\min_{\forall \gamma} -\left(\ln \prod_i p(a_i(\gamma) \mid n)\right) = \min_{\forall \gamma} \sum_i \frac{1}{2}\left[ln 2\pi a_i(\gamma) + \left(\frac{n - a_i(\gamma)}{\sqrt{a_i(\gamma)}}\right)^2\right]$$

In one embodiment, the likelihood that a source at a particular position produced the observed measurements is computed. The likelihood is given by Eq. (13). There are several parameters that appear in Eq. (13), that must first be estimated: $\eta_0 \lambda_b \Delta t, \eta_0 \lambda_s, \Delta t$, and $\eta_i/\eta_0$, i=1, N–1

For the reference detector without the presence of source, estimate $\eta_0 \lambda_b \Delta t$ by maximizing with respect to $\eta_0 \lambda_b \Delta t$ the likelihood that Eq. (13) produced the detector data. For this special case, in Eq. (13), N=1 and since there is no source, $\eta_0 \lambda_s \Delta t=0$. Equation (13) assumes a single count observation window from each detector. This extends to M contiguous observation windows for each detector. Let the counts obtained for detector 0 in the successive windows 0, 1, 2, ..., M–1 be denoted by $n_{00}, n_{01}, \ldots, n_{0M-1}$, respectively. Since the total count in a window is independent of that in any other window, the probability of getting a particular sequence of window counts is the product of the probabilities for the count in each of the windows. Thus, the likelihood that our model produced the data is $$p_{0M}(n_{00}, n_{01}, \ldots, n_{0_{M-1}}) = \qquad (17)$$

$$\prod_{k=0}^{M-1} p_0(\eta_0 \lambda_s \Delta t = 0, \eta_0 \lambda_b \Delta t, r_0/r_0, \eta_0/\eta_0 | n_{0k})$$

where the right-hand side is evaluated according to Eq. (12)

For the remaining detectors one-by-one without presence of a source, $\eta_i/\eta_0$ is estimated by maximizing with respect to $\zeta_i/\eta_0$ the likelihood our model produced the detector data. The assumption is that the background count rate registered by each detector differs from the others only as a result of differing total detection efficiency. These differences can be due to a variety of factors including the individual detector characteristics, the detector sizes and shapes, the lower level discriminator settings, and the detector calibrations. The likelihood is then $$p_{iM}(n_{i0}, n_{i1}, \ldots, n_{iM-1}) = \qquad (18)$$

$$\prod_{k=0}^{M-1} p_i(\eta_0 \lambda_s \Delta t = 0, \eta_0 \lambda_b \Delta t, r_0/r_i, \eta_i/\eta_0 | n_{ik})$$

Note that in the above expression, the value for $\eta_0 \lambda_b \Delta t$ is the value obtained in Step 1

For all detectors simultaneously in presence of a source, estimate $\eta_0 \lambda_s \Delta t$ by maximizing with respect to it and $r_0/r_i$ (as they identify a hypothesized position of the source) the likelihood the present invention's model produced the detector data. This likelihood is $$\prod_{i=0}^{N-1} \prod_{k=0}^{M-1} p_i(\eta_0 \lambda_s \Delta t, \eta_0 \lambda_b \Delta t, r_0/r_i, \eta_i/\eta_0 | n_{ik}) \qquad (19)$$

Note that in the above expression, the value for $\eta_0 \lambda_b \Delta t$ is the value obtained in Step 1 and the value for $\eta_i/\eta_0$ is the value obtained in Step 2. The likelihood must be maximized with respect to not only $\eta_0 \lambda_s \Delta t$ but also $r_0/r_i$.

Testing refers to the actual on-line real-time monitoring of counts to estimate the position of the source. The maximum likelihood method is used. From previously estimated values of $\eta_0 \lambda_b \Delta t$, $\eta_i/\eta_0$, i=1, . . . , N-1, and $\eta_0 \lambda_s \Delta t$ the most likely location of the source is located by maximizing with respect to location in two-dimensional space the likelihood Eq. (13) produced the detector data.

Data Acquisition

In one embodiment, initial data acquisition, collection, and storage relies on the MCA, such as that sold by ORTEC under the trade name digiBase digital MCA, coupled to NaI detectors. Data acquisition software for the command, control, data collection, and storage may be performed using the LabView application. This includes functions for displaying the spectra, changing detector parameters (like gain and HV), and even energy calibrating the detectors (See Figures and discussion below regarding GUI).

In one embodiment, data acquisition is designed for a system of up to 6 detectors. Post-processing tasks and data transmission times associated with the list mode collection can cause a practical limit on the count rate that is unacceptable. So, in one embodiment, the data collection allows the system to collect a spectrum for each detector for a preselected time interval. In one exemplary embodiment, one second intervals are used during all of the initial tests, but it can be reduced to a practical limit of about 100 milliseconds or increased.

In one embodiment, a Sequential Analysis Test (SAT) is used to detect a source. SAT is a statistical test for consistency between a time-sampled signal and a reference Gaussian distribution of known mean and variance. With each new sample, the SAT algorithm issues good, bad, or need more data decision. A Training Phase is used in one embodiment to learn the mean and variance of reference distribution. Behind the main window are tabs for all of the system functions like detector and system set-up, detector calibration, detector spectral display, and parameter and display controls. Some of these windows were shown in the previous figures.

Rigorous Treatment of Uncertainties—A rigorous means for predicting from detector signals when the underlying physics model is becoming degenerate as a result of "low" signal strength on some detectors (i.e. signal strength is approaching background) will be developed. In essence the tracking method breaks down when noise or uncertainties are at a level where they obscure the underlying deterministic physics. This condition manifests itself as the most probable location occupying large regions rather than a single point. It can be detected through a stochastic analysis of the equations that are used to generate the likelihood function.

In one embodiment, the present invention includes a method and apparatus for improving performance for "low" signal strength cases. The present invention overcomes poor signal-to-noise ratio, and the degeneracy it leads to, by introducing physically-based constraints on the solution. In one embodiment, the laws of motion are used to constrain predicted position given detector data across successive time frames. In another exemplary embodiment, the subdivision of energy spectrum into bands and limiting localization data analysis to only those bands where source energy is present. In yet another exemplary embodiment, source strength parameter is estimated using data across multiple time frames rather than a single time frame as is presently done.

In one embodiment, the present invention provides for the consideration of the shielding effect from people. The tracking method of the present invention is extended to account for distributed shielding materials. The shielding of the source by individuals passing between the source and detector can be thought as falling into three classes, each amenable to solution: point shield, uniformly distributed shielding, and spatially skewed shielding. In point shield, a single person shielding a single detector can be detected as a loss of correlation among detector signals. A surrogate can be generated using the DDFM algorithm for the signal from the shielded detector. In uniformly distributed shielding the presence of uniformly distributed shielding material introduces an additional parameter whose value can be estimated if there are four or more detectors. A uniform distribution would approximate the case where the monitored area has a constant flux of individuals such that the collective shielding effect can be considered relatively constant. In spatially-skewed shielding the population density in the monitored space is not reasonably uniform. In addition, one of ordinary skill in the art would appreciate that other techniques can be employed (such as video image diagnostics) to determine spatially-dependent shielding coefficients.

In one embodiment, the present invention accounts for the efficiency of numerical algorithms. Avenues which increase data processing speeds of the signal processing algorithms are utilized in one embodiment of the present invention. Real-time implementation requires rapid execution of the signal processing algorithms.

Location of Source

In one embodiment, the present invention utilizes a detector count probability density function which is a function of efficiency and distance:

$$p(r_0^2\eta_0\lambda\Delta t, r_0/r_i, \eta_i/\eta_0 \mid n) =$$

$$\frac{1}{\left(2\pi\left(\frac{r_0}{r_i}\right)^2\left(\frac{\eta_i}{\eta_0}\right)r_0^2\eta_0\lambda\Delta t\right)^{1/2}} \exp\left(-\frac{\left(n - \left(\frac{r_0}{r_i}\right)^2\left(\frac{\eta_i}{\eta_0}\right)r_0^2\eta_0\lambda_b\Delta t\right)^2}{2\left(\frac{r_0}{r_i}\right)^2\left(\frac{\eta_i}{\eta_0}\right)r_0^2\eta_0\lambda\Delta t}\right)$$

In on embodiment, localization is derived using a Multiple Detector Probability Density Function (MDPDF)

$$f(n_0, n_1, \ldots, n_{N-1}) = \prod_{k=0}^{N-1} p(r_0^2\eta_0\lambda\Delta t, r_0/r_k, \eta_k/\eta_0 \mid n_k)$$

Figure 15:
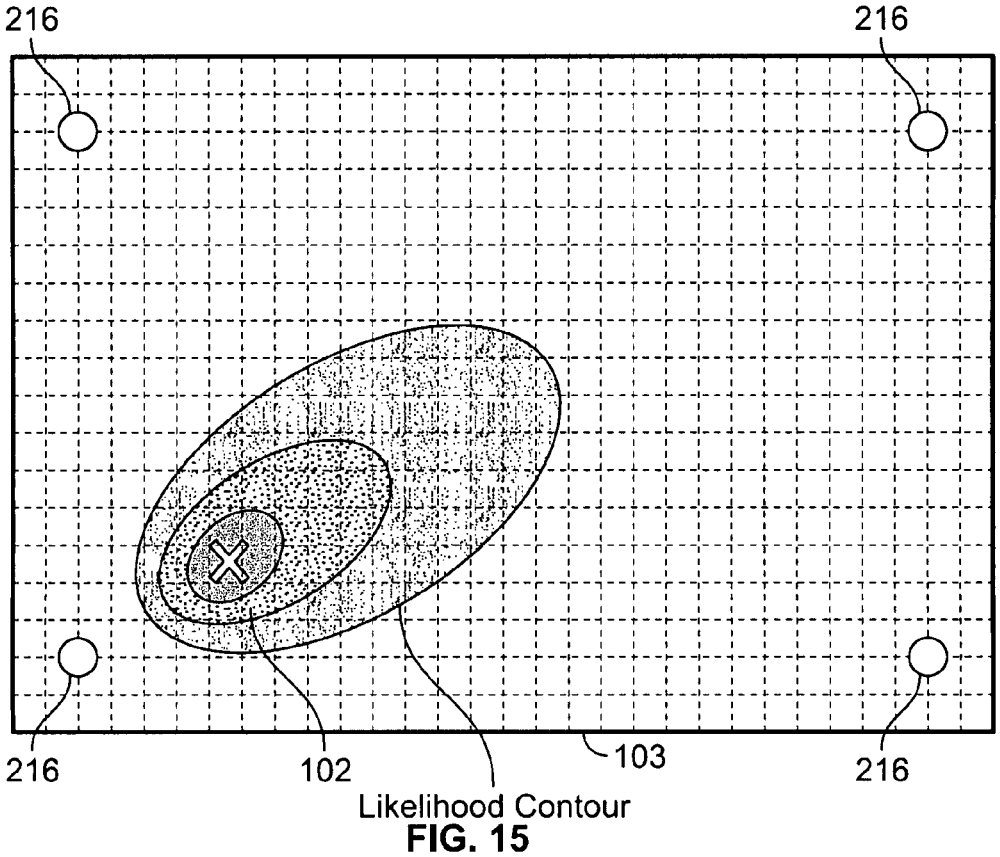
FIG. 15 is graph depicting a location of source in accordance with the principles of the present invention.

Likelihood Function from MDPDF provides the highest probability location and degree of uncertainty. FIG. 15 is an graphical depiction of the likelihood contour of a source located within a boundary having detectors at the four corners.

In addition, to general location awareness, the present invention contemplates site-specific learning. Detector response in general is non-uniform over a terrain map. For example, fixed obstructions block view and the detector response function has a spatial/directional dependence. In one embodiment, DDFM is used to learn these response relations for a specific site.

In one embodiment, the present invention provides for a shielded or failed detector. In one scenario the detector produces inconsistent or abnormal signals such as where a object or person temporarily shields a detector or where there is a detector failure. In one scenario, there is no source present. In this scenario, the present invention 21 will poll detectors one by one for abnormal statistics compared to detector historical data. Detection with the SAT and sensor logic tree as discussed above is utilized. In addition, in one embodiment, the detector is dropped until statistics return to normal. In the scenario where a source is present, the detectors are polled one by one for a deterministic signal that is inconsistent with other detectors. In one embodiment, the inconsistency is detected among an over-determined set of detectors. In another embodiment, the detector is dropped until signal is again consistent with other detectors, wherein site learning data with time-correlated data may be used.

The sensitivity of the tracking system is primarily a function of the number of detectors and their sizes. In one embodiment, the system comprise one of three different NaI detector combinations: four detectors each two inches by two inches, four detectors each three inches by three inch inches, and four detectors each three inches by twelve inches.

Graphical User Interface

The GUI provides a display of the present invention's results. In one embodiment, the GUI is being comprises a laptop computer using LabView™. The user interface is set up to contain one high level window which contains the detector readings and alarm indicators, the PDF map of the source location, video display of the monitored area, and control buttons for system command and configuration.

Figure 7:
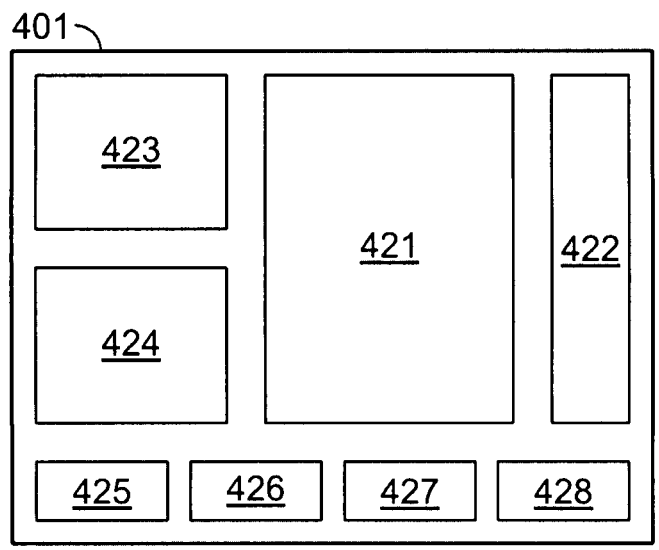
FIG. 7 is a general layout for a main panel for one embodiment of the present invention.

FIG. 7 depicts one embodiment of a main panel layout 401 on a GUI. Panel 421 displays counting level graphs for all the detectors 216, wherein counts for each time interval are shown. Panel 422 is the alarming system for monitoring abnormal counting level where the logical output from the alarming function will be shown by LEDs. Panel 423 displays the probability density function (PDF) scale map for localizing the source. In one embodiment, room schematics and detector spots are also shown in this 2-D map. Panel 424 is a video image showing the real picture of the detection area. In one embodiment, the video focuses to where the highest probability is in the PDF. Additional panels 425-428 are provided as needed for system control buttons leading to lower level screens, including but not limited to: video camera control, hardware configuration, detector calibration, training mode, measurement control, and software display.

In one embodiment, approximately twenty minutes are needed for software in accordance with the principles of the present invention to characterize the background radiation and for it to estimate the detector efficiency ratios. On completion of this phase the system is ready to enter service and perform the source detecting and tracking functions. In service the system runs in essentially real time. Strictly, since the operator interface is updated every second (by default) with the results from new measurements, the time to collect and process new measurements is about a second. The update rate is user settable. The system can also be operated in a batch mode where data is collected over a user-defined window of time.

Figures 8, 9:
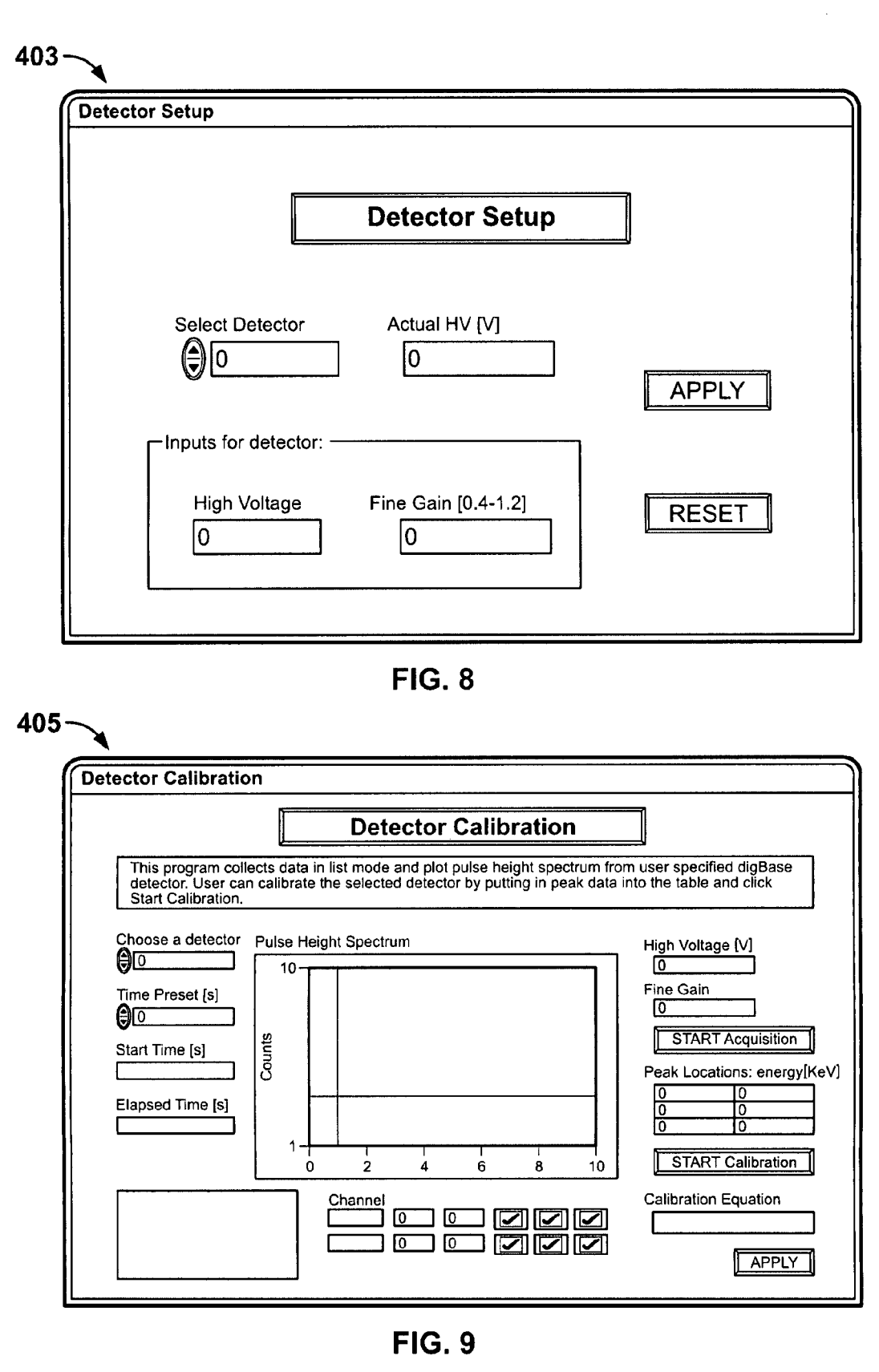
Figure 10:
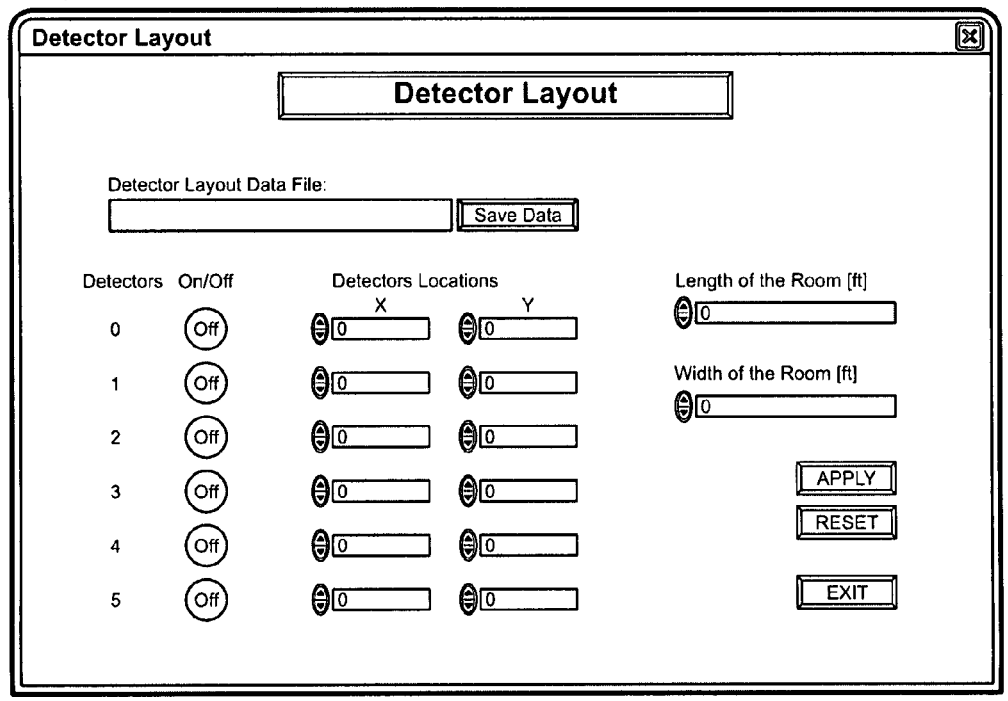
FIG. 10 is a screen shot of a detector layout specification GUI for one embodiment of the present invention.
Figure 11:
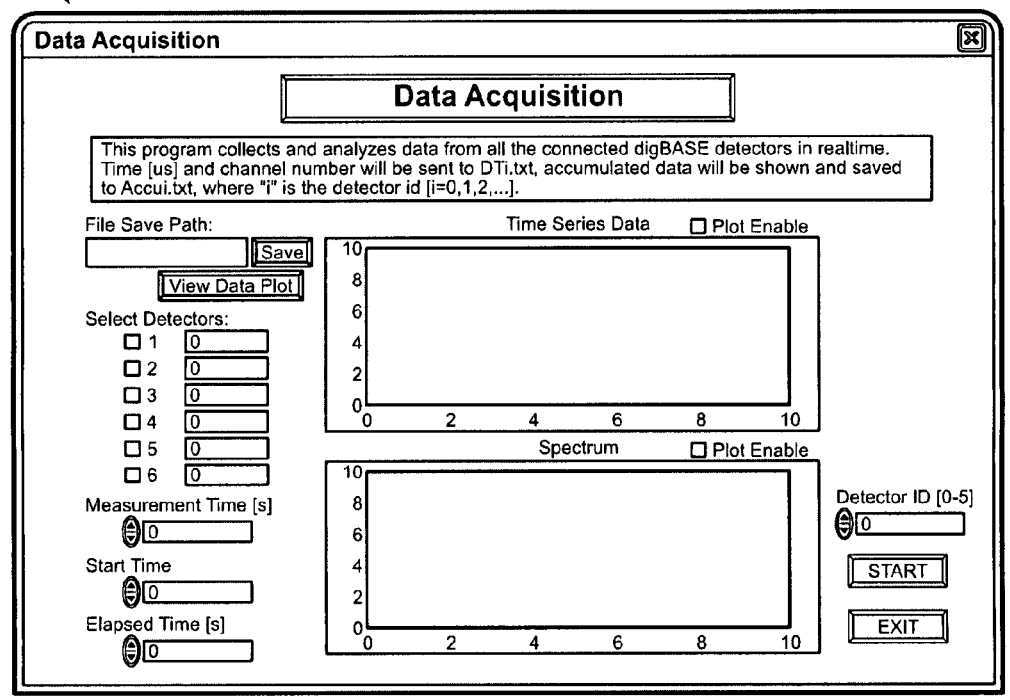
FIG. 11 is a screen shot of a data acquisition checkout GUI for one embodiment of the present invention.

In one embodiment the present invention relates to a method for testing an area for a radiation source. First, the detector is setup and calibrated. The user inputs the high voltage threshold in the FIG. 8 GUI 403. The user sets the energy to channel number correspondence via the GUI 405 in FIG. 9 using a known source. Next the detector layout is specified. The detector configuration is provided to the system as a collection of points on a two-dimensional grid. The GUI 407 for inputting this data is shown in FIG. 10. Next, data acquisition occurs. The basic operability of the data acquisition task is assessed by viewing data from individual detectors. The GUI 409 in FIG. 11 provides a capability for selecting individual detectors, controlling the time window over which they are sampled, and then viewing the spectral content of that detector. When used in conjunction with a known source, the operability can be confirmed.

Figure 12:
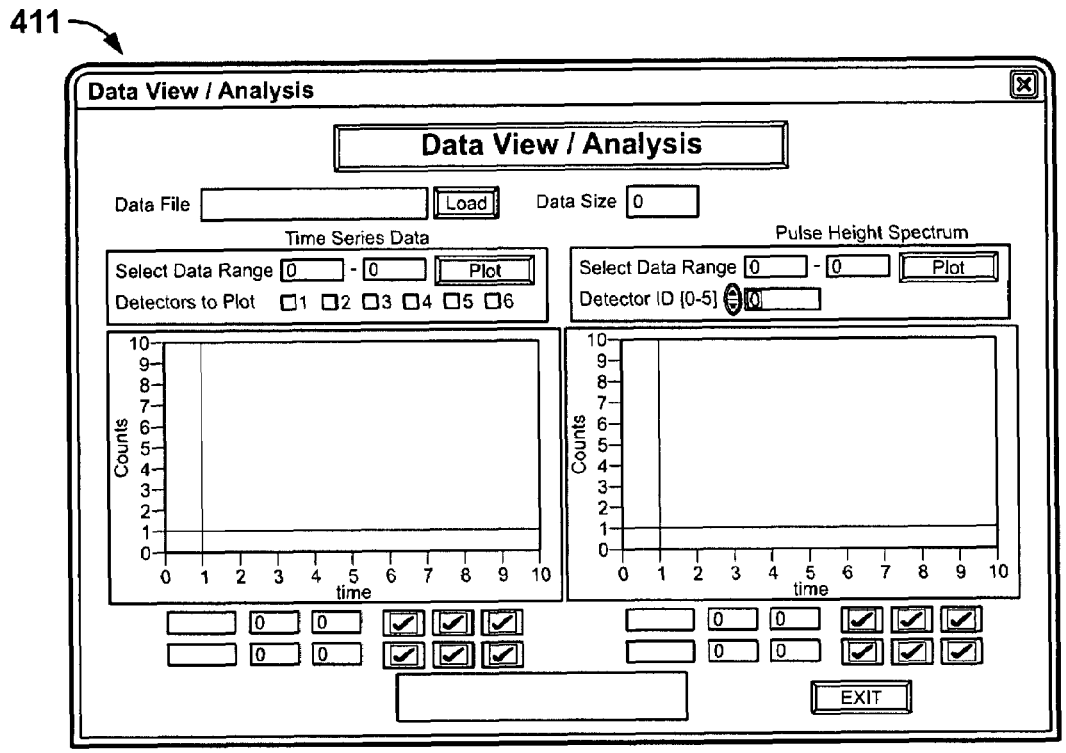
FIG. 12 is a screen shot of a data viewing and analysis GUI for one embodiment of the present invention.

Once data has been acquired, it can be viewed and analyzed. This step provides the operator with a simple capability to examine the interdependence between source strength and its distance from detector as they relate to the actual signal observed at the detector. This step is provided to allow the operator to perform some basic sensitivity studies. By moving a known source about the venue he can develop a qualitative appreciation for those factors specific to his hardware and venue that impact system sensitivity. Any factors that might adversely affect performance in a gross sense would become apparent in this step. The GUI 411 for this step is shown in FIG. 12.

Figure 13:
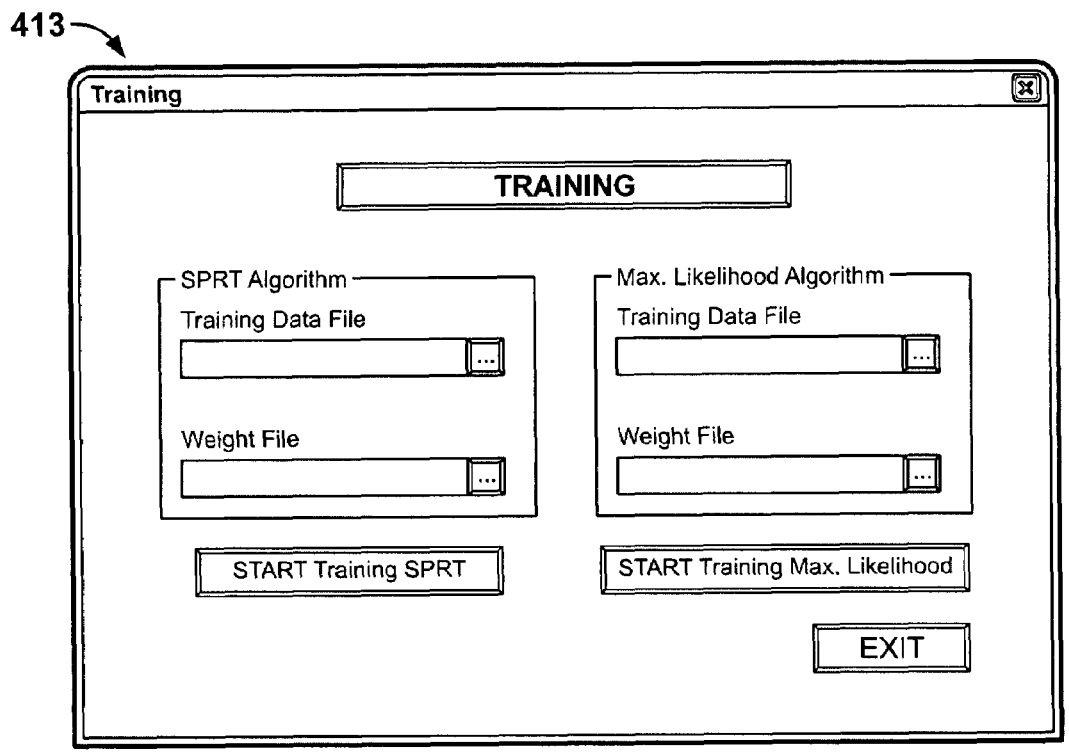
FIG. 13 is a screen shot of a learning venue and detector specific characteristics GUI for one embodiment of the present invention.

In one embodiment, venue and detector specific characteristics are learned. There are venue and detector specific parameters that the system must learn the values of through a so-called training session. These are background strength and the ratio of detector efficiencies. Both these parameters are used in the SAT algorithm for alarming and the maximum likelihood algorithm for source localization. The learning is performed with the GUI 413 shown in FIG. 13.

Figure 14:
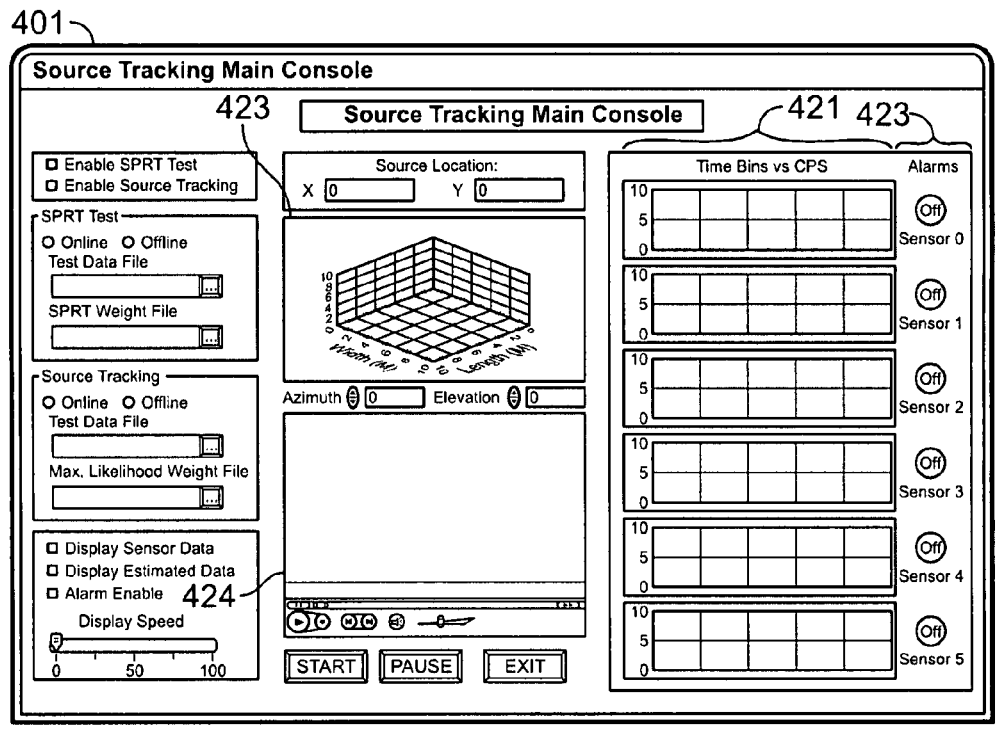
FIG. 14 is a screen shot of a source detection and tracking GUI for one embodiment of the present invention.

In another exemplary embodiment, the strength-distance detection threshold is determined. In this step the SAT alarming capability is used to establish the size of the Detection Perimeter (DP) that surrounds the detectors for which a source of Specified Minimum Strength (SMS) will be detected. The detection sensitivity will be a function of parameters that control the probability of obtaining a false positive and missing a true positive. These parameters will in general not be operator settable. The SMS will be a function of the types of perceived threats and in general will not be operator settable. The perimeter may be established by walking a source with strength equal to the SMS about the venue, entering the locations where the SAT alarms into the venue grid and building up a map of the perimeter for display in this manner. One specific embodiment of the general panel layout of FIG. 7 is shown as the GUI 401 of FIG. 14.

In one embodiment, the present invention is provided with Connectivity to computer through USB port(s). In one embodiment a computer, e.g., a laptop, hard drive used for data collection either as permanent or temporary storage on hard drive or for download to central server or CD-ROM.

One embodiment of the present invention includes a graphical user interface. While various functionality of the such a GUI would be understood by one skilled in the art, such functionality can include the following. For system set-up, venue specific information, detector information, calibration, surveillance and video. For monitor system status and display, functionality includes alarm states, detector states, and a video feed. Reporting functionality may also be provided on the GUI.

For detection of a source, the background statistics must first be learned. The method of learning the background statistics comprises, in one embodiment, dividing time into contiguous windows, accumulating the counts in each window, representing statistics of the background by the PDF formed from the count rate in each window over all windows.

The background is assumed to be Gaussian with Constant $\lambda$ and $\sigma$. Then SAT is used to detect introduction of a new source, wherein the present invention looks for a sequence of time windows exhibiting count rates inconsistent with PDF of background. The time window may be designed in accordance with the principles of the present invention to be of various lengths. The choice of the time windowing is based on many factors including: the number of detectors and sizes, the minimum detectable level, the uncertainty on location (speed of target), and the population density Of the possible emission types one can monitor, gamma rays are the most readily detectable radioactive decay products. They are energetic, have large interaction cross sections with detector materials, and require relatively large shielding masses to hinder chance of detection. The energy of gamma rays of interest from an unshielded source is typically above 100 keV up to 3 MeV. Background gamma ray energies are concentrated predominantly at low energy, typically below about 200 keV, with a few weak peaks at higher energies due to known isotopes, such as $^{40}K$. Background radiation tends to be at different energies than full energy photopeaks from source emissions—although this is a generic statement that does not apply to all sources. However, in accordance with the principles of the present invention the different spectral characteristics of source emissions compared to background emissions, can be used to increase detector sensitivity. As a further complication to detection, shielding of a source introduces Compton scattering that can downshift the spectrum emanating from the source. In accordance with the principles of the present invention, the signal-to-noise ratio for a detector signal can be significantly improved by only considering a small energy band around the full energy photopeak energy.

The real challenge for detection is to perform source detection and location tracking in situations where the source strength as seen at the detector is not much above background. It follows that one should take the statistics of the source and uncertainties in the detectors into account to get best detection sensitivity. The longer the sample, the more counts obtained and the better characterized of the radiation environment. This applies to both background radiation signal and source radiation signal. In the case of background, it is possible to sample for an extended time period prior to the equipment going into service to obtain a well characterized background. But in the case of in-service operation, the source may be moving, thus requiring a constant update on its estimated position, and so this is not given to accumulating good statistics if the signal is just above background. Also, because the physics of point sources is dominated by the $1/r^2$ effect, the ability of the present invention to localize the source based on smaller samples allows for a larger detection range, lower minimum detectable sources, and improved tracking for faster moving sources.

In one exemplary embodiment, the present invention allows for pinpointing and tracking of the location of the source in real-time. This differs from existing systems which perform a crude localization function based on which detectors are alarming.

In one exemplary embodiment, an operator interface console runs on laptop for ease of deployment. The operator interface supports initial setup including system calibration, data acquisition for training of signal processing algorithms, and viewing results of source detection and tracking tasks.

In one exemplary embodiment, detectors can be self-powered and wireless. Rechargeable battery provides for 24 hours continuous operation. Detectors can also be operated using Cabling (USB and Cat-5) and powered from standard AC power through USB hubs.

In one exemplary embodiment, the present invention is a low profile system for unobtrusive monitoring. In one exemplary embodiment, the number of detectors is user selectable, subject to sensitivity requirements.

In one exemplary embodiment, confidence in predicted source location is reflected in likelihood contours.

In one exemplary embodiment, the present invention includes the learning of site specific characteristics including background radiation level, detector spatial arrangement, and detector response function including effect of shielding from permanent obstructions for increased overall system sensitivity and reliability.

In one exemplary embodiment, the predicted location of source is rendered as ghost-image that is superimposed on video camera image of venue. Operator uses composite image as an aid for visual identification of purveyor of source.

In one embodiment, the present invention offers the advantage of locating and tracking a source without having a person in close proximity to the source. In addition, the present invention is applicable to moving detectors when the detector and position data can be transmitted in near real-time. In one exemplary embodiment, fixed and mobile detectors are integrated into same display.

In one embodiment, the system provides three distinct functions during monitoring: alarming when a source is detected by any single detector node, tracking of the location of the source in real-time, and collection of a gamma-ray energy spectrum for performing source identification.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A portable system for the detection of a radioactive source in an environment, comprising:
    a plurality of distributed radiation detectors for capturing radiation information, whereby radioactive source detection is performed using Sequential Analysis Test;
    a video camera for capturing video data
    a data collection and storage system in communication with the plurality of radiation detectors and video camera for storage of the radiation information and video data;
    a decision making architecture for processing the radiation information;
    a graphical user interface for real-time display of the processed radiation information and the video data.

2. The portable system of claim 1, further comprising a global positioning system in communication with the decision architecture wherein the location of the portable system and the radioactive source are determined using global positioning.

3. The portable system of claim 1, wherein the at least one plurality of distributed radiation detectors comprises a plurality of distributed radiation detectors arranged in an array.

4. The portable system of claim 3, wherein the plurality of distributed radiation detectors are arranged in a rectangular array.

5. A method for detecting radiation using a portable device having a plurality of radiation detectors, comprising:
    calibration of the plurality of radiation detectors;
    training of the portable device to account for the environment in which the radiation detection occurs;
    detection of one of a plurality of independent events by each of the plurality of radiation detectors and providing a radiation detector signal for each of plurality of radiation detectors;
    determination of the location of the radiation source;
    determination of the strength of the radiation source;
    multivariate state estimation of each of the detector signals and comparison of the actual data with the estimation for each of the plurality of detectors wherein an inconsistency between the estimation and the actual indicates a shielded detector;
    displaying of the results, in real-time, of the radiation detection on a graphical user interface of the portable device.

6. The method of claim 5, wherein the source is tracked using the maximum likelihood method.

7. The method of claim 5, wherein the estimate is utilized in the determination of the location of the radiation source rather than the actual data when a discrepancy between the actual and the estimate occurs.

8. The method of claim 5, further comprising indicating an alarm when a radiation source is detected.

9. A system for the detection of radiation comprising:
    a plurality of portable radiation detectors for detecting radiation in an environment, each of the plurality of portable radiation detectors spaced non-coincidentally to minimize Compton Scattering;
    a video camera in optical communication with the environment;
    a decision making architecture for processing data from the portable radiation detector comprising computer program code for:
    calibration of the radiation detector;
    training of the portable device to account for the environment in which the radiation detection occurs;
    detection of the radiation;
    display of the results of the radiation detection on a graphical user interface of the portable device
        an operator interface comprising a graphical user interface for receiving information from the decision making architecture and the video camera and for controlling the decision making architecture.

10. The system for the detection of radiation of claim 9 wherein source detection is performed using Sequential Analysis Test.

11. The system for the detection of radiation of claim 9, wherein the source is tracked using the maximum likelihood method.

12. The system for the detection of radiation of claim 9, further comprising computer program code for multivariate state estimation of each of the detector signals and comparison of the actual data with the estimation for each of the plurality of detectors wherein an inconsistency between the estimation and the actual indicates a shielded detector.

13. The system for the detection of radiation of claim 12, wherein the estimate is utilized in the determination of the location of the radiation source rather than the actual data when a discrepancy between the actual and the estimate occurs.

14. The system for the detection of radiation of claim 9, further comprising an alarm in communication with the detectors for indicating when a radiation source is detected.

15. A method for detecting radiation using a portable device having a radiation detector, comprising:
    calibration of the radiation detector;
    training of the portable device to account for the environment in which the radiation detection occurs;
    detection of the radiation source;
    determination of the location of the radiation source;
    determination of the strength of the radiation source;
    displaying of the results of the radiation detection on a graphical user interface of the portable device; and
    tracking the source using the maximum likelihood method.

16. The method of claim 15, wherein source detection is performed using Sequential Analysis Test.

17. The method of claim 16, further comprising providing a plurality of radiation detectors.

18. The method of claim 17, further comprising multivariate state estimation of each of the detector signals and comparison of the actual data with the estimation for each of the plurality of detectors wherein an inconsistency between the estimation and the actual indicates a shielded detector.

19. The method of claim 18, wherein the estimate is utilized in the determination of the location of the radiation source rather than the actual data when a discrepancy between the actual and the estimate occurs.

20. The method of claim 18, further comprising indicating an alarm when a radiation source is detected.

* * * * *